July 16, 1968  L. O. MYERS  3,392,993

SWIVEL ASSEMBLY AND METHOD

Filed Aug. 29, 1966

INVENTOR
LEON O. MYERS

WARREN, BROSLER, CYPHER & ANGLIM
ATTORNEYS

United States Patent Office 3,392,993
Patented July 16, 1968

3,392,993
SWIVEL ASSEMBLY AND METHOD
Leon O. Myers, 9848 Holly St.,
Oakland, Calif. 94603
Filed Aug. 29, 1966, Ser. No. 575,596
4 Claims. (Cl. 285—94)

ABSTRACT OF THE DISCLOSURE

A swivel assembly having inner and outer components rotatedly interlocked by a solidified incomplete bearing ring to provide a grease chamber in communication with a conventional grease fitting installed in the outer component, the grease chamber being formed by pouring solidifiable material against a plug inserted through the grease fitting opening in the outer component.

My invention relates to pipe couplings and more particularly to a swivel assembly.

Among the objects of my invention are:

(1) To provide a novel and improved swivel assembly;

(2) To provide a novel and improved swivel assembly which may be produced economically;

(3) To provide a novel and improved swivel assembly which utilizes but one sealing ring;

(4) To provide a novel and improved swivel assembly of simple construction but highly resistant to leakage and adapted for heavy duty use;

(5) To provide a novel and improved swivel assembly possessing low friction, yet which is well sealed against leakage;

(6) To provide a novel and improved swivel assembly capable of withstanding substantial moment stresses;

(7) To provide a novel and improved swivel assembly which can be used either as a dry swivel, or one capable of being greased to permit of operation on a continual rotation basis;

(8) To provide a novel and improved swivel assembly having storage capacity for a lubricant;

(9) To provide a novel and improved method of fabricating a swivel assembly capable of use either as a dry swivel or one capable of being lubricated; and

(10) To provide a novel and improved method of fabricating a swivel assembly having storage capacity for lubricant.

Additional objects of my invention will be brought out in the following description of a preferred embodiment of the same, taken in conjunction with the accompanying drawings, wherein.

Figure 1:
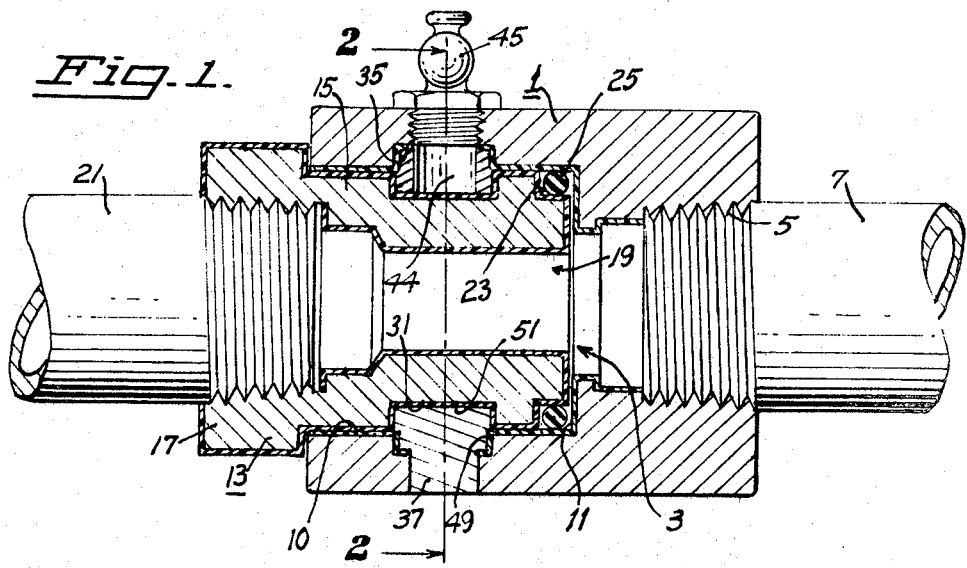
FIGURE 1 is a longitudinal view in section through one embodiment of my invention.
Figure 2:
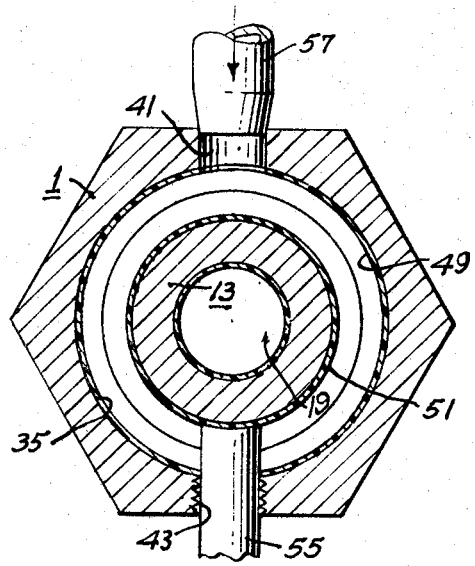
FIGURE 2 is a transverse view in section, in the plane 2—2 of FIGURE 1 and depicting an intermediate stage in the assembling of the swivel assembly of FIGURE 1.
Figure 3:
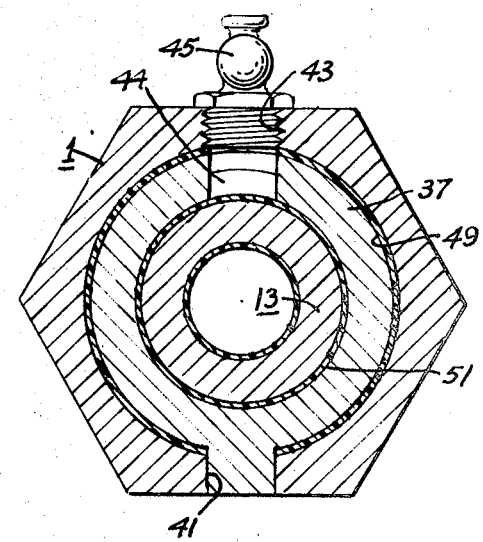
FIGURE 3 is a corresponding view showing the swivel assembly upon completion of the assembling operation, and available for internal lubrication.
Figure 4:
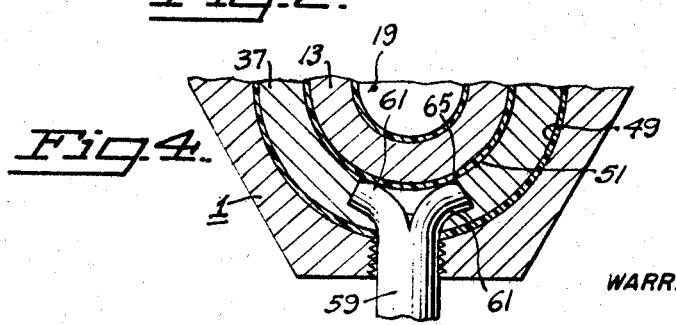
FIGURE 4 is a fragmentary view depicting means for increasing the lubricant storage capacity of the swivel assembly.

Referring to the drawings for details of my invention in its preferred form the same comprises an outer component 1, having a longitudinal passageway 3 therethrough, which is threaded at one end 5 for connection of a pipe 7, or fitting, or the like.

At its other end, the outer component is recessed or counterbored to form an internal cylindrical wall 10 and internal shoulder 11.

For assembling with the outer component, is a complementary inner component 13, including a smooth fitting cylindrical portion 15 having an exposed head 17 at one end, and provided with an axial passageway 19 on the same axis as the passageway 3 of the outer component, with the head end of the passageway threaded for connection of a pipe 21, or fitting, or the like.

The inner end of the complementary component is formed with a circumferential corner groove 23 to receive an O-ring 25 or other available sealing ring, to effect sealing at this point in the swivel assembly.

The outer and inner components of the swivel assembly are assembled with the sealing ring installed between the shoulder 11 and the proximate end of the inner component, and to reduce probable friction in this region, I contemplate coating the sealing ring with a friction reducing material such as powdered molybdenum, sometimes referred to a moly-disulfide.

Where the swivel assembly is likely to be employed in systems handling petroleum products or the like, a sealing ring of material resistant to such chemicals should be employed. In this category, a sealing ring of synthetic rubber such as butadiene will function very adequately.

To maintain the proper relationship between the aforementioned components when assembled, the inner component 13 of the assembly is rotatably interlocked with the outer member 1, by interlocking means between the opposing walls thereof, and when thus interlocked, the sealing ring will protect the same from liquid or gases flowing through the swivel assembly.

To accomplish such interlocking, I preferably provide a circumferential groove 31 in the outer cylindrical wall of the inner component, and an opposing groove 35 in the inner wall 10 of the outer component, and rely on filling material 37, solidified from a molten state within such grooves, to effect the interlocking of the inner and outer components.

To accomplish this end, I provide a pair of openings 41, 43 in the outer component 1, in the plane of the opposing grooves, and preferably disposed diametrically with respect to each other. When located diametrically, they both may be drilled in one operation.

For the purpose of the present invention, at least one of said openings should be threaded and of a diameter to threadedly secure a conventional type grease fitting 45, while the other opening may be left unthreaded, as this opening is to function as a filling opening in carrying out the method of the present invention.

The filler material should preferably comprise a casting alloy having a relatively low melting temperature, and therefore one which is adapted to solidify from a liquid state at around such temperatures. When low melting temperature casting alloy is employed, the groove in at least one of the components, is provided with a surface coating 49, 51 of a character which will withstand the temperature of the molten alloy and not fuse or combine with such alloy.

Fluorocarbon resin plastics known as "Teflon," which form a smooth coating when sprayed on metal which has been previously heated to approximately 700 degrees Fahrenheit, is admirably suited for such purpose. Such material is not only chemically inert, but fills the pores of the metal and lays down a smooth surface, and, of considerable importance, it has a low coefficient of friction.

In applying such coatings, I prefer, at the same time, to coat the entire outer surface of the inner component and the inner surface of the outer component, as this will tend to provide lower coefficient of friction between opposing contact surfaces and otherwise chemically protect the coated metal.

Casting alloys having melting temperatures under 550 degrees Fahrenheit will satisfy the requirements of the present invention, as a bearing metal when "Teflon" is employed, and many such alloys are available. An alloy of tin, lead and antimony is but one example.

For higher pressure service, an alloy known by the trade name Kirksite may be employed. This alloy is a zinc based self lubricating alloy having a shear strength of 34,000 pounds per square inch and will withstand pressures of the order of 3,000 pounds per square inch at 400° F. Its melting temperature is 717° F.

With the inner component thus coated with "Teflon," it is assembled into the outer component, with the sealing ring 25 properly installed. While held in such assembled relationship, a plug 55 of wood, nylon, or other suitable material is inserted through the threaded opening 43 to the point of pressure engaging the bottom of the groove of the inner component, and with the plugged opening lowermost, the casting alloy, in molten form, is poured either by gravity or under pressure, into the opposing grooves through a nozzle 57 engaging in the remaining opening 41, until such remaining opening becomes filled with the casting alloy, following which the alloy is permitted solidify, and the plug 55 is then withdrawn, leaving an unfilled portion beneath the threaded opening to function as a storage chamber 44, for lubricant, which can then be introduced through the grease fitting 45, subsequently installed in such opening.

If the swivel assembly is to be utilized as a dry swivel, the threaded opening 43, may be closed with a plug in lieu of the grease fitting.

Should a larger lubricant chamber be desired, one way of accomplishing this would be to employ a plug 59 of flexible material such as nylon, and having a split end to form legs 61. These are each preferably rounded off slightly at its inner edge 65 to assure spreading of the legs as the plug is pressed into position. Following solidification of the filler alloy, the plug will be withdrawn to leave a chamber of greater volume than would be realized through the use of the simple plug 55.

In lieu of pouring by gravity or under pressure, a vacuum process may be employed, in which case, the plug must provide a passageway into the swivel components and the vacuum procedure must be terminated before the filler alloy can enter the plug passageway.

It will be apparent from the foregoing description of my invention that the same fulfills all the objects thereof, and while I have described the same in its preferred form and in considerable detail, the invention is subject to alterations and modification without departing from the underlying principles involved, and I accordingly to not desire to limit my protection to the specific details illustrated and described except as may be necessitated by the appended claims.

I claim:

1. A swivel coupling comprising an outer hollow component having an internal peripheral groove and first and second openings in the wall of said component in flow communication with said internal peripheral groove, said first opening being circular in cross section and threadedly receiving a grease fitting, an inner swivel coupling component rotatably installed in said outer component, said inner component having an external peripheral groove in registry with said internal peripheral groove to form an annular chamber having a portion lying in said outer component and a portion lying in said inner component, solidified material filling said annular chamber and extending into said second opening, thereby preventing rotation of said solidified material within said annular chamber, said solidified material having a recess formed therein opposite said circular opening to form a grease chamber adapted to be filled through said grease fitting and the surface of said external peripheral groove being slidable with respect to said solidified material to provide for swiveling action between said inner and outer components.

2. A swivel coupling in accordance with claim 1, characterized by an anti-stick coating on the surface of said external peripheral groove.

3. The method of assembling a swivel coupling involving an outer hollow component, and an inner component adapted to be rotatably installed in said outer component, said method comprising providing an internal peripheral groove in the inner side of said outer hollow component, a pair of openings in the wall of said outer component in flow of communication with said internal peripheral groove, and threading one of said openings to receive a grease fitting and providing an external peripheral groove in the outer side of said inner component, and further providing said external peripheral groove with an anti-stick smooth surface coating, assembling said inner component into said outer component to bring said internal peripheral groove and said outer peripheral groove into registry, and inserting a plug through said threaded opening and into engagement with the bottom surface of the peripheral groove in the outer side of said inner component, and flowing solidifiable material which will not bond to said surface coating on said external peripheral groove, in flowable state through the other of said openings, solidifying said material to rotatably interlock said components and form a chamber at said other opening adapted to receive a lubricant, removing said plug from said threaded opening and threadedly inserting a grease fitting into said threaded opening.

4. The method of claim 3, characterized by said plug being of flexible material and split at its inserted end, and applying sufficient pressure to said plug to spread the split end when engaging the bottom surface of said inner component groove, to thereby form a larger chamber for lubricant.

References Cited
UNITED STATES PATENTS

| | | | |
|---|---|---|---|
| 1,466,738 | 9/1923 | Morse | 164—132 |
| 1,544,930 | 7/1925 | Pack | 164—132 |
| 1,908,861 | 5/1933 | Foglein | 249—63 X |
| 2,906,548 | 9/1959 | Faccou | 285—94 X |
| 3,095,644 | 7/1963 | Curry | 29—460 |
| 3,288,496 | 11/1966 | Myers | 285—94 |

EDWARD C. ALLEN, *Primary Examiner.*

CARL W. TOMLIN, *Examiner.*

T. F. CALLAGHAN, R. G. BERKLEY,
*Assistant Examiners.*